United States Patent [19]
Tamai et al.

[11] Patent Number: 5,210,174
[45] Date of Patent: May 11, 1993

[54] PREPARATION PROCESS OF POLYIMIDE

[75] Inventors: Shoji Tamai; Hideaki Oikawa, both of Kanagawa; Masahiro Ohta, Fukuoka; Akihiro Yamaguchi, Kanagawa, all of Japan

[73] Assignee: Mitsui Toatsu Chemicals, Inc., Tokyo, Japan

[21] Appl. No.: 612,461

[22] Filed: Nov. 14, 1990

[30] Foreign Application Priority Data

Nov. 22, 1989 [JP] Japan ................... 1-301868

[51] Int. Cl.$^5$ ............... C08G 69/26; C08G 73/10; C08G 8/02; C08G 14/00
[52] U.S. Cl. ................... 528/353; 528/125; 528/126; 528/128; 528/170; 528/172; 528/173; 528/176; 528/179; 528/183; 528/185; 528/188; 528/220; 528/226; 528/229; 528/351; 528/352
[58] Field of Search ........... 528/125, 126, 128, 170, 528/173, 172, 183, 188, 176, 179, 185, 220, 226, 229, 352, 351, 353

[56] References Cited

U.S. PATENT DOCUMENTS

| | | | |
|---|---|---|---|
| 4,024,101 | 5/1977 | Takekoshi et al. | 524/879 |
| 4,358,581 | 11/1982 | Sutton, Jr. | 528/353 |
| 4,687,836 | 8/1987 | Ibi et al. | 528/353 |
| 4,696,994 | 9/1987 | Nakajima et al. | 528/176 |
| 4,837,299 | 6/1989 | Peters et al. | 528/353 |
| 4,871,833 | 10/1989 | Hupfer | 528/353 |

FOREIGN PATENT DOCUMENTS

| | | |
|---|---|---|
| 192869 | 9/1986 | European Pat. Off. |
| 274121 | 7/1988 | European Pat. Off. |
| 670611 | 4/1966 | France |
| 3610999 | 9/1958 | Japan |
| 58-4056 | 1/1983 | Japan |

OTHER PUBLICATIONS

Applied Polymer Symposium No. 26, 429-435, "The Thermal Stability of Phthalocyanine and Polymeric Phthalocyanine in Air".

*Primary Examiner*—John Kight, III
*Assistant Examiner*—P. Hampton-Hightower
*Attorney, Agent, or Firm*—Burns, Doane, Swecker & Mathis

[57] ABSTRACT

In a process for the preparation of polyimide by reacting a diamine compound with tetracarboxylic dianhydride in a phenol based solvent, an improved process for reacting the diamine compound with tetracarboxylic dianhydride in a solution by forming separate solutions of the tetracarboxylic dianhydride and the diamine compound and mixing the solutions and/or by dissolving tetracarboxylic dianhydride in the phenol-based solvent containing an organic base.

13 Claims, No Drawings

PREPARATION PROCESS OF POLYIMIDE

BACKGROUND OF THE INVENTION

1. Field of the Invention

The present invention relates to a process for preparing polyimide and more particularly, relates to an improved process for preparing polyimide having good thermal stability.

2. Description of the Related Art

Polyimide obtained by the reaction of diamine compounds with tetracarboxylic acid dianhydride is excellent in mechanical strength and dimensional stability in addition to exhibiting high thermal resistance, flame retardance, electrical insulation, chemical resistance and other characteristics. Hence, polyimide has conventionally been used in many fields such as electric and electronic members, space and aeronautics parts and transportation equipment. Many preparation processes of polyimide have been investigated.

For example, Japanese Patent Publication SHO 36-10999(1961) proposes a process for preparing polyimide by reacting a diamine compound with a tetracarboxylic dianhydride in an amide-based solvent to obtain a polyamic acid, the precursor of polyimide, and then carrying out chemical imidization by using imidizing agents such as acetic anhydride to prepare the polyimide having a recurring unit corresponding to the polyamic acid.

The process is unfavorable from the industrial viewpoint that a long time is required for the polymerization of polyamic acid which is the precursor of polyimide and storage stability of the polyamic acid is poor. Acetic acid is formed in the imidization reaction and is difficult to remove from the desired product polyimide. When polyimide is molded in the presence of acetic acid, problems such as foaming take place.

As to a method for solving these problems, a method of preparing polyimide by reacting a diamine compound with a tetracarboxylic acid dianhydride in a phenol-based solvent such as cresol and conducting heat dehydrating reaction to obtain polyimide has been proposed in F. W. Harris et al, Applied Poly. Symposium, No. 26, p421–428(1975) and Japanese Patent Publication SHO 58-4056(1983).

Such process can improve problems that occur in the process where polyamic acid is formed in the phenol based solvent and successively imidized or where polyamic acid is formed in the above amide based solvent and successively subjected to chemical imidization in acetic anhydride.

The process proposed by Harris et al is to prepare a polyamic acid-cresol solution by using m-cresol as a solvent and isoquinoline as a catalyst. However, tetracarboxylic dianhydride used in the process is phenylated bisphthalic anhydride having a specific structure represented by the formula (1) or the formula (2):

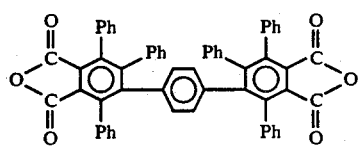

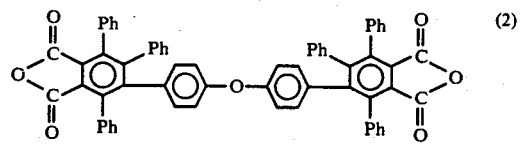

No example has been known disclosing the use of tetracarboxylic dianhydrides having low solubility in solvents, for example, pyromellitic dianhydride and benzophenonetetracarboxylic dianhydride which are usually used in industry.

These process also have the disadvantages that oligomers are formed by the difference of solubility in the phenol-based solvent between the diamine compound and tetracarboxylic dianhydride and contamination of oligomer impairs the thermal stability of polyimide, and that structurally modified specific tetracarboxylic dianhydride are required in order to enhance solubility in the phenol based solvent.

SUMMARY OF THE INVENTION

A first object of the present invention is to provide a simple process for producing polyimide having excellent properties.

A second object of the present invention is to provide a process capable of steadily supplying polyimide powder having good thermal stability.

As a result of an intensive investigation in order to accomplish the above objects, the present inventors have found that polyimide having good thermal stability can be obtained by previously preparing monomer solutions containing the diamine compound and tetracarboxylic dianhydride respectively in an individual phenol-based solvent, starting polymerization by mixing both solutions, and successively heating to conduct a dehydrating ring-closure reaction. A more remarkable effect can be found in the above process when the monomer solution containing the tetracarboxylic dianhydride in the phenol based solvent is prepared in the presence of an organic base, and that polyimide having good thermal stability can be obtained by directly reacting the diamine compound with a tetracarboxylic dianhydride in the phenol-based solvent containing an organic base to form a polyamic acid solution and then heating to carry out dehydrating ring closure reaction. Thus the present invention has been completed.

One aspect of the present invention is a process for reacting a diamine compound represented by the formula (I):

wherein $R_1$ is a divalent radical selected from the group consisting of an aliphatic group, alicyclic group, monocyclic aromatic group, fused polycyclic aromatic radical group and polycyclic aromatic group connected to each other through a direct bond or a bridge member, with a tetracarboxylic dianhydride having the formula (II):

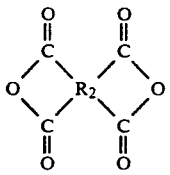
(II)

wherein $R_2$ is a tetravalent radical selected from the group consisting of an aliphatic group, alicyclic group, monocyclic aromatic group, fused polycyclic aromatic group and polycyclic aromatic group connected to each other through a direct bond or a bridge member, to prepare a polyimide having a recurring units represented by the formula (III):

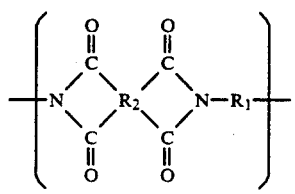
(III)

wherein $R_1$ and $R_2$ are individually selected from the group consisting of an aliphatic group, alicyclic group, monocyclic aromatic group, fused polycyclic aromatic group and polycyclic aromatic group connected to each other through a direct bond or a bridge member, $R_1$ is a divalent radical and $R_2$ is a tetravalent radical ; by dissolving the diamine compound of the formula (I) and the tetracarboxylic dianhydride of the formula (II) in a phenol-based solvent, starting polymerization to form a polyamic acid, and successively reacting at a temperature of at least 100° C. while removing water generated by imide ring closure to prepare polyimide corresponding to the raw material monomers ;

(1) said process comprising dissolving the diamine compound and the tetracarboxylic dianhydride, respectively, in separate phenol-based solvents and starting polymerization by mixing the resultant solutions;

(2) said process comprising, in the above process (1), dissolving the tetracarboxylic dianhydride in a phenol-based solvent containing an organic base ; and (3) said process comprising reacting the diamine compound with the tetracarboxylic dianhydride in the phenol-based solvent in the presence of the organic base.

According to the process of the invention, polyimide having essentially excellent properties can be obtained that is free from problems such as poor imidization ratio resulting from its production process, contamination of oligomer components formed, and multiplephase contamination accompanied by insufficient removal of residual solvent, and accordingly liberated from disadvantages such as a decrease in thermal resistance and deterioration of processing ability due to these problems. Thus the process of the invention provides an improved process for preparing polyimide.

High thermal resistance, excellent physical properties and improved processing ability will further be required for future polyimides. The process of the invention can produce polyimide capable of meeting such requirements and utilization of the process is greatly expected.

Further, the process for preparing a polyimide in the invention can be conducted in the phenol-based solvent by polymerization of a polyamic acid and successive imide-ring closure by heat. The process is of course simple and easy in workability, and can readily remove contaminants which lead to lower thermal stability of the polyimide. Consequently, the process is extremely excellent in industry and also suitable for a mass production system.

DESCRIPTION OF THE PREFERRED EMBODIMENTS

Exemplary diamine compounds of the formula (I) for use in the process of the invention include ethylenediamine, m-aminobenzylamine and p-aminobenzylamine wherein $R_1$ is an aliphatic radical in the formula (I) : 1,4-diaminocyclohexane wherein $R_1$ is an alicyclic radical ; m-phenylenediamine, o-phenylenediamine and p-phenylenediamine wherein $R_1$ is a monocyclic aromatic radical ; 2,6-diaminonaphthalene wherein $R_1$ is a fused polycyclic aromatic radical; 4,4'-diaminobiphenyl and 4,3'-diaminobiphenyl wherein $R_1$ is a polycyclic aromatic radical connected through a direct bond ; and bis(3-aminophenyl) ether, (3-aminophenyl)(4-aminophenyl) ether, bis(4-aminophenyl) ether, bis(3-aminophenyl) sulfide, (3-aminophenyl)(4-aminophenyl) sulfide, bis(4-aminophenyl) sulfide, bis(3-aminophenyl) sulfoxide, (3-aminophenyl)(4-aminophenyl) sulfoxide, bis(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis [4-(3-aminophenoxy)phenyl] methane, bis [4-(4-aminophenoxy)phenyl] methane, 1,1-bis [4-(3-aminophenoxy)phenyl] ethane, 1,1-bis [4-(4-aminophenoxy)phenyl] ethane, 1,2-bis [4-(3-aminophenoxy)phenyl] ethane, 1,2-bis [4-(4-aminophenoxy)phenyl] ethane, 2,2-bis [4-(3-aminophenoxy)phenyl] propane, 2,2-bis [4-(4-aminophenoxy)phenyl] propane, 2,2-bis [4-(3-aminophenoxy)phenyl] butane, 2,2-bis [4-(4-aminophenoxy)phenyl] butane, 2,2-bis [4-(3-aminophenoxy)phenyl] -1,1,1,3,3,3-hexafluoropropane, 2,2-bis [4-(4-aminophenoxy)phenyl] -1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl, bis [4-(3-aminophenoxy)biphenyl] ketone, bis [4-(4-aminophenoxy)biphenyl] ketone, bis [4-(3-aminophenoxy)phenyl] sulfide, bis [4-(4-aminophenoxy)phenyl] sulfide, bis [4-(3-aminophenoxy)phenyl] sulfoxide, bis [4-(4-aminophenoxy)phenyl] sulfoxide, bis [4-(3-aminophenoxy)phenyl] sulfone, bis [4-(4-aminophenoxy)phenyl] sulfone, bis [4-(3-aminophenoxy)phenyl] ether, bis [4-(4-aminophenoxy)phenyl] ether, 1,4-bis [4-(3-aminophenoxy)benzoyl] benzene, 1,3-bis [4-(3-aminophenoxy)benzoyl] benzene, 4,4'-bis [3-(4-aminophenoxy)benzoyl] diphenyl ether, 4,4'-bis [3-(3-aminophenoxy)benzoyl] diphenyl ether, 4,4'-bis [4-(4-amino-α, α-dimethylbenzyl)phenoxy] benzophenone, 4,4'-bis [4-(4-amino-α, α-dimethylbenzyl)phenoxy] diphenyl sulfone, and bis [4-(4-aminophenoxy)phenyl] sulfone wherein $R_1$ is a polycyclic aromatic radical connected to each other through a bridge member.

The diamine compound which is favorably used for the raw material of polyimide has the formula (I) wherein $R_1$ is a polycyclic aromatic radical connected through a direct bond or a bridge member and is represented by the formula (V) :

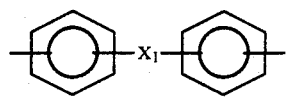

(V)

wherein $X_1$ is a direct bond, $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$

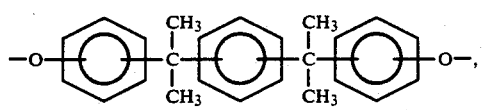

or

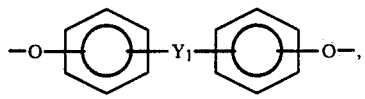

wherein $Y_1$ is a direct bond, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$, 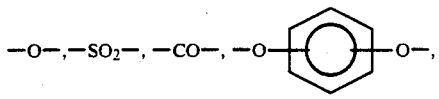

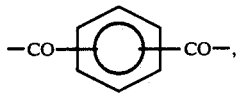

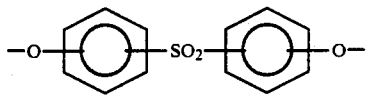

or

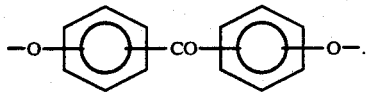

Representative examples of the diamine compound are illustrated above.

Exemplary tetracarboxylic dianhydrides of the formula (II) for use in the process of the present invention include ethylenetetracarboxylic dianhydride and butanetetracarboxylic dianhydride wherein $R_2$ is an aliphatic radical in the formula (II); cyclopentanetetracarboxylic dianhydride and cyclohexanetetracarboxylic dianhydride wherein $R_2$ is an alicyclic radical; 1,2,3,4-benzenetetracarboxylic dianhydride and pyromellitic dianhydride wherein $R_2$ is a monocyclic aromatic radical; 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride wherein $R_2$ is a fused polycyclic aromatic radical; 3,3',4,4'-biphenyltetracarboxylic dianhydride and 2,2',3,3'-biphenyltetracarboxylic dianhydride wherein $R_2$ is a polycyclic aromatic radical connected through a direct bond; and 3,3',4,4'-benzophenonetetracarboxylic dianhydride, 2,2',3,3'-benzophenonetetracarboxylic dianhydride, 2,2 bis(3,4-dicarboxyphenyl)propane dianhydride, 2,2-bis(2,3-dicarboxyphenyl)propane dianhydride, bis(3,4-dicarboxyphenyl) ether dianhydride, bis(2,3-dicarboxyphenyl) ether dianhydride, bis(3,4-dicarboxyphenyl) sulfone dianhydride, bis(2,3-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride and 4,4'-(m-phenylenedioxy)diphthalic dianhydride wherein $R_2$ is a polycyclic aromatic radical connected through a bridge member.

The tetracarboxylic acid dianhydride which is favorably used for the raw material of polyimide has the formula (II) wherein $R_2$ is a polycyclic aromatic radical connected through a direct bond or a bridge member and is represented by the formula (VI):

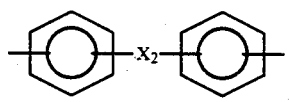

(VI)

wherein $X_2$ is a direct bond, $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$,

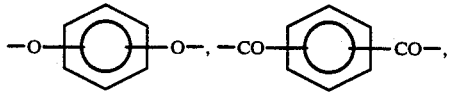

or

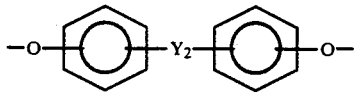

wherein $Y_2$ is a direct bond, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$ or $-CH_2-$.

Particularly preferred dianhydride is pyromellitic dianhydride.

Representative examples of the phenol-based solvent used in the present invention include phenol, m-cresol, o-cresol, p-cresol, cresylic acid, ethylphenol, isopropylphenol, tert-butylphenol, xylenol, chlorophenol, dichlorophenol and phenylphenol. The phenol-based solvent may be used singly or as a mixture.

The organic base which is present in the preparation of a monomer solution or a polyamic acid solution includes, for example, triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline and isoquinoline. Pyridine and γ-picoline are preferred.

In the preparation of polyimide which is suitable for use as a molding material, for example, monoamine or dicarboxylic acid anhydride is generally added as an end capper of polymer chain end in the polymerization step or may also be present in the preparation step of a polyamic acid solution.

Exemplary dicarboxylic anhydrides which can be used as an end capper of polymer chain end include phthalic anhydride. 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic acid anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride.

Exemplary monoamine compounds which can be used as the end capper of polymer end include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzotrifluoride, m-aminobenzotrifluoride, p-aminobenzotrifluoride, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 4-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthlamine, β-naphthylamine, 1-amino-2-naphthol, 2-amino-1-naphthol, 4-amino-1-naphthol, 5-amino-1-naphthol, 5-amino-2-naphthol, 7-amino-9-naphthol, 8-amino-1-naphthol, 8-amino-2-naphthol, 1-aminoanthracene, 2-aminoanthracene and 9-aminoanthracene.

The above mentioned various monomers and agents may be used in accordance the following embodiments in the process of the invention.

The above-mentioned process (1) of the present invention comprises dissolving the diamine compound and the tetracarboxylic dianhydride, respectively, in an individual phenol-based solvent and starting polymerization by mixing both solutions. In the practice of the process, the diamine compound of the formula (I) and the tetracarboxylic dianhydride of the formula (II) are reacted to obtain the polyimide of the formula (III) by preparing monomer solutions containing the diamine compound and the tetracarboxylic dianhydride respectively in the individual phenol-based solvent, mixing both solutions and reacting at temperature of at least 100° C. to obtain the corresponding polyimide.

The concentration of the separately prepared monomer solutions is different depending upon the monomer species and the kind of the phenol-based solvent, and no particular limitation is imposed on the concentration. The concentration is generally from 5 to 50 wt %, preferably from 10 to 30 wt % in view of workability. The temperature of the monomer solutions is usually 200° C. or less, Preferably 100° C. or less. In preparing the monomer solution, the monomer solvent mixture may be heated in the above temperature range.

The reaction temperature is from 100° to 300° C., preferably from 150° to 250° C.

No particular restriction is placed upon the reaction pressure. Atmospheric pressure is sufficient for carrying out the reaction.

The reaction time is different depending upon the type of the solvent and reaction temperature, and a time of 4 to 24 hours is usually sufficient for the reaction.

The above-mentioned process (2) of the present invention comprises, in the above process (1), dissolving the tetracarboxylic dianhydride in a phenol-based solvent containing the organic base. In the practice of the process, the diamine compound of the formula (I) and the tetracarboxylic dianhydride of the formula (II) are reacted to obtain the polyimide of the formula (III) by preparing a monomer solution obtained by dissolving the diamine compound in the phenol-based solvent and another monomer solution obtained by dissolving the tetracarboxylic dianhydride in the phenol-based solvent in the presence of the organic base, mixing both solutions and reacting at a temperature of at least 100° C. to obtain the corresponding polyimide.

In the preparation of the monomer solution containing the tetracarboxylic dianhydride in the phenol-based solvent, the amount of the organic base which is present in the phenol-based solvent is different depending upon the monomer species and the kind of the phenol-based solvent. The amount is usually from 10 to 1000 mole %, preferably from 100 to 300 mole % per mole of the monomer.

The presence of the organic base in the separately prepared solution of the diamine compound in the phenol-based solvent does not cause a problem.

Further, the concentration of the monomer solutions, the mixing temperature of the monomer solutions and, the other reaction conditions can be the same as in the above process for the preparation of polyimide.

The above-mentioned process (3) of the present invention comprises reacting the diamine compound with the tetracarboxylic dianhydride in the phenol-based solvent in the presence of the organic base. In the practice of the process, the diamine compound of the formula (I) and the tetracarboxylic dianhydride of the formula (II) are reacted in the presence of the organic base in the phenol-based solvent to obtain a solution of polyamic acid represented by the formula (IV):

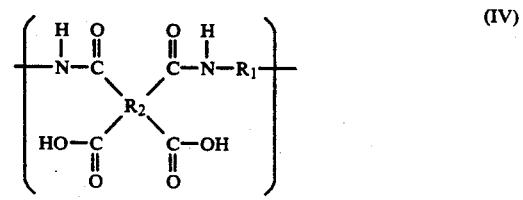

(IV)

wherein $R_1$ and $R_2$ are individually selected from the group consisting of an aliphatic group, alicyclic group, monocyclic aromatic group, fused polycyclic aromatic group and polycyclic aromatic group connected to each other through a direct bond or a bridge member, $R_1$ is a divalent radical and $R_2$ is a tetravalent radical, and the solution is successively heated to a temperature of at least 100° C. to prepare the corresponding polyimide.

That is, in conducting the process, the diamine compound and the tetracarboxylic dianhydride are directly added to the phenol-based solvent containing the organic base and reacted to form a solution containing the resultant polyamic acid. The solution is successively heated to a temperature of at least 100° C. to obtain the corresponding polyimide.

In preparing the polyamic acid solution by such process, the amount of the organic base which is present in the phenol-based solvent is usually from 0.1 to 10 moles, preferably from 1.0 to 3.0 moles per mole of the tetracarboxylic dianhydride.

The amounts of the diamine compound and the tetracarboxylic dianhydride which are added to the phenol-based solvent containing the organic base is different depending upon the monomer species and the kind of the phenol-based solvent and no particular limitation is imposed upon the amount. The amount of each monomer is usually from 5 to 50 wt %, preferably from 10 to 30 wt % in view of workability. The proportion of the diamine compound to the tetracarboxylic dianhydride is in the range of from 0.8 to 1.2, preferably from 0.9 to 1.0.

In the most common procedures, the organic base and the diamine compound are added to the phenol-based solvent and then the tetracarboxylic dianhydride is added by portions to the resulting mixture.

The reaction temperature for preparing the polyamic acid solution is usually 100° C. or less, preferably 60° C. or less. No particular restriction is placed on the reaction pressure. The reaction can be sufficiently carried out under atmospheric pressure. Reaction time is different depending upon the monomer species, the kind of the solvent and the reaction temperature. The reaction is usually carried out for a time sufficient to complete formation of the polyamic acid. A reaction time of from 1 to 24 hours is usually satisfactory.

The polyamic acid solution thus obtained is converted to the corresponding polyimide by heating to at least 100° C. while removing the water generated by the imidizing ring-closure reaction.

The reaction temperature in the imidizing ring-closure is at least 100° C., preferably at least 150° C. No particular limitation is put on the reaction pressure. The reaction can be satisfactorily carried out under atmospheric pressure. The reaction time is different depending upon the kind of the solvent and the reaction temperature. A reaction time of from 4 to 24 hours is usually satisfactory.

The present invention will hereinafter be illustrated further in detail by way of examples and comparative examples.

Physical properties in the examples and comparative examples were measured by the following methods.

(1) Inherent viscosity($\eta$):

0.50 g of polyimide powder was dissolved by heating in 100 ml of a solvent mixture composed of p-chlorophenol/phenol in ratio of 9/1 by weight and the viscosity of the solution was measured at 35° C.

(2) Glass transition temperature (Tg):

Measured by DSC (Shimadzu DT-40 Series DSC-41M)

EXAMPLE 1

To a reaction vessel equipped with a stirrer, reflux condenser, water separator, nitrogen inlet tube and discharge port, 42.29 g (0.194 mole) of pyromellitic dianhydride, 1.78 g (0.012 mole) of phthalic anhydride, 15.8 g (0.2 mole) of pyridine and 195.6 g of m-cresol were charged. Pyromellitic dianhydride and phthalic anhydride were dissolved with stirring under nitrogen atmosphere to prepare 255.5 g of monomer solution A.

To the same reaction vessel as above 29.2 g (0.1 mole) of 1,3 bis(3-aminophenoxy)benzene and 79.54 g of m-cresol were charged and heated to 50° C. with stirring under nitrogen atmosphere to dissolve 1,3-bis(3-aminophenoxy)benzene. Thus 108.8 g of monomer solution B was separately prepared. To the monomer solution B, 127.7 g of monomer solution A was added under a nitrogen atmosphere and heated to 202° C. with stirring while distilling out 3.6 cc of water. The reaction was further conducted at 202° C. for 4 hours. The reaction mixture was thereafter cooled to room temperature and poured into 1.5 l of methyl ethyl ketone. The precipitate was filtered to obtain a light yellow polyimide powder.

The polyimide powder was washed with methyl ethyl ketone and dried at 200° C. for 6 hrs under a nitrogen atmosphere to obtain 46.92 g (98.5% yield) of polyimide powder.

The polyimide had $\eta$ of 0.51 dl/g, Tg of 221° C. and 1% weight loss temperature was 521° C.

COMPARATIVE EXAMPLE 1

To the same reaction vessel as used in Example 1, 29.2 g (0.1 mole) of 1,3-bis(3-aminophenoxy)benzene and 177.3 g of N-methyl-2-pyrrolidone was charged and 21.15 g (0.097 mole) of pyromellitic dianhydride was added by portions with caution to prevent temperature rise of the solution. The mixture was stirred for 20 hours at room temperature to obtain a polyamic acid solution.

To the polyamic acid solution, 0.888 g (0.006 mole) of phthalic anhydride was added at room temperature under a nitrogen atmosphere and further stirred for an hour. Thereafter 7.9 g (0.1 mole) of pyridine and 40.8 g (0.4 mole) of acetic anhydride were added to the solution and stirred for 10 hours at room temperature. The reaction mixture was poured into 1.5 l of methyl ethyl ketone. The precipitate was filtered to obtain a light yellow powder. The powder was washed with methyl ethyl ketone and dried at 200° C. for 6 hours under a nitrogen atmosphere to obtain 46.68 g (98% yield) of polyimide powder.

The polyimide powder thus obtained had $\eta$ of 0.50 dl/g and Tg of 221° C. However, the 1% weight loss temperature was 479° C.

COMPARATIVE EXAMPLE 2

To the same reaction vessel as used in Example 1, 29.2 g (0.1 mole) of 1,3-bis(3-aminophenoxy)benzene, 21.15 g (0.097 mole) of pyromellitic dianhydride, 0.888 g (0.006 mole) of phthalic anhydride, 7.9 g (0.1 mole) of pyridine and 177.3 g of m-cresol were charged and heated to 202° C. with stirring under a nitrogen atmosphere while distilling out 3.6 cc of water. After reacting further for 4 hours at 202° C., the reaction mixture was cooled to room temperature and poured into 1.5 l of methyl ethyl ketone. The precipitate was filtered to obtain a light yellow powder. The powder was washed with methyl ethyl ketone and dried at 200° C. for 6 hours under a nitrogen atmosphere to obtain 46.97 g (98.6% yield) of polyimide powder.

The polyimide powder had η of 0.51 dl/g, Tg of 221° C. and 1% weight loss temperature of 498° C.

EXAMPLE 2

To the same reaction vessel as used in Example 1, 14.92 g (0.068 mole) of pyromellitic dianhydride, 1.066 g (0.0072 mole) of phthalic anhydride, 5.70 g (0.0726 mole) of pyridine and 68.9 g of m-cresol were charged. Pyromellitic dianhydride and phthalic anhydride were dissolved with stirring under a nitrogen atmosphere to obtain 90.57 g of monomer solution C.

In the next step, the same reaction vessel as above was charged with 22.1 g (0.06 mole) of 4,4'-bis(3-aminophenoxy)biphenyl and 60.0 g of m-cresol. The mixture was heated to 50° C. with stirring under nitrogen atmosphere to obtain 82.11 g of separate monomer solution D.

To the monomer solution D, 75.48 g of monomer solution C was added under nitrogen atmosphere and heated to 202° C. with stirring while distilling out 2.1 cc of water. The reaction was further conducted at 202° C. for 4 hours. The reaction mixture was thereafter cooled to room temperature and poured into 1.5 l of methyl ethyl ketone. The precipitate was filtered to obtain a yellow powder. The powder was washed with methyl ethyl ketone and dried at 200° C. for 6 hours under a nitrogen atmosphere to obtain 32.6 g (98% yield) of polyimide powder. The polyimide powder had η of 0.50 dl/g, Tg of 252° C. and 1% weight loss temperature of 540° C.

EXAMPLE 3

To the same reaction vessel as used in Example 1, 62.15 g (0.193 mole) of 3,3',4,4'-benzophenonetetracarboxylic dianhydride, 2.79 g (0.03 mole) of γ-picoline and 310.7 g of phenol were charged and the mixture was heated to 120° C. with stirring under a nitrogen atmosphere to obtain 375.6 g of monomer solution E.

In the next step, 21.2 g (0.1 mole) of 3,3'-diaminobenzophenone and 57.6 g of phenol were charged to the same reaction vessel as used in Example 1 and heated to 90° C. with stirring under a nitrogen atmosphere to obtain 78.8 g of separate monomer solution F.

To the monomer solution F, 187.8 g of monomer solution E was added and heated to 182° C. with stirring while distilling out 3.6 cc of water. The reaction was further conducted at 182° C. for 4 hours. The reaction mixture was then cooled to 50° C. and poured into 1.5 l of methyl ethyl ketone. The precipitate was filtered to obtain a light yellow powder.

The powder was washed with methyl ethyl ketone and dried at 200° C. for 6 hours under a nitrogen atmosphere to obtain 47.2 g (97% yield) of polyimide powder.

The polyimide powder had η of 0.50 dl/g, Tg of 239° C. and 1% weight loss temperature of 522° C.

Results of Examples 1 to 3 and Comparative Examples 1 and 2 are summarized in Table 1.

EXAMPLE 4

To the same reaction vessel as used in Example 1, 29.2 g (0.1 mole) of 1,3-bis(3-aminophenoxy)benzene, 15.8 g (0.2 mole) of pyridine and 185.6 g of m-cresol were charged and 21.15 g (0.097 mole) of pyromellitic dianhydride was added by portions under a nitrogen atmosphere with caution to prevent a temperature rise of the solution above 50° C.

Stirring was continued for 4 hours and 0.888 g (0.006 mole) of phthalic anhydride was added. Thereafter stirring was further continued for an hour to obtain polyamic acid as a light yellow transparent solution. The solution was heated to 202° C. while distilling out 3.6 cc of water. The reaction was further continued at 202° C. for 4 hours. The reaction mixture was then cooled to room temperature and poured into 1.5 l of methyl ethyl ketone. The precipitate was filtered to obtain a light yellow powder.

The powder was washed with methyl ethyl ketone and dried at 200° C. for 6 hours under a nitrogen atmosphere to obtain 46.92 g (98.5% yield) of polyimide powder.

Polyimide powder had η of 0.51 dl/g, Tg of 221° C. and 1% weight loss temperature in air of 523° C.

EXAMPLE 5

To the same reaction vessel as used in Example 1, 22.1 g (0.06 mole) of 4,4'-bis(3-aminophenoxy)biphenyl, 9.42 g (0.12 mole) of pyridine and 128.7 g of m-cresol were charged and 12.36 g (0.0567 mole) of pyromellitic dianhydride was added by portions under a nitrogen atmosphere with caution to prevent a temperature rise of the solution above 50° C.

Stirring was continued for 4 hours and 0.977 g ($6.6 \times 10^{-3}$ mole) of phthalic anhydride was added. Thereafter stirring was further continued for an hour to obtain polyamic acid as a light yellow, transparent, viscous solution. The solution was heated to 202° C. while distilling out 2 cc of water. The reaction was further continued at 202° C. for 4 hours. The reaction mixture was then cooled to room temperature and poured into 1 l of methyl ethyl ketone. The precipitate was filtered to obtain a yellow powder.

The powder was washed with methyl ethyl ketone and dried at 200° C. for 6 hours under a nitrogen atmosphere to obtain 32.6 g (98% yield) of polyimide powder.

The polyimide powder had η of 0.50 dl/g, Tg of 252° C. and 1% weight loss temperature of 542° C.

COMPARATIVE EXAMPLE 3

To the same reaction vessel as used in Example 1, 22.1 g (0.06 mole) of 4,4'-bis(3-aminophenoxy)biphenyl and 128.7 g of m-cresol were charged and 12.36 g (0.0567 mole) of pyromellitic dianhydride was added by portions with caution to prevent a temperature rise of the solution above 50° C. The reaction was continued for 4 hours and 0.977 g ($6.6 \times 10^{-3}$ mole) of phthalic anhydride was added. The reaction mixture was stirred for an hour. The reaction mixture, however, became a slurry and a transparent polyamic acid solution could not be obtained.

EXAMPLE 6

To the same reaction vessel as used in Example 1, 21.2 g (0.1 mole) of 3,3'-diaminobenzophenone; 9.3 g (0.1 mole) γ-picoline and 200 g of phenol were charged and 31.07 g (0.0965 mole) of 3,3',4,4'-benzophenone tetracarboxylic dianhydride was added by portions under a nitrogen atmosphere with caution to prevent a temperature rise of the solution above 50° C.

Stirring was continued for 4 hours and 1.036 g ($7 \times 10^{-3}$ mole) of phthalic anhydride was added. Thereafter stirring was further continued for an hour to obtain polyamic acid as a light yellow, transparent, viscous solution. The solution was heated to 150° C. while distilling out 3.5 cc of water. The reaction was further continued at 145° to 150° C. for 4 hours. The reaction mixture was then cooled to room temperature and poured into 1.5 l of methyl ethyl ketone. The precipitate was filtered to obtain yellow powder.

The powder was washed with methyl ethyl ketone and dried at 200° C. for 6 hours under a nitrogen atmosphere to obtain 48.2 g (97% yield) of polyimide powder.

The polyimide powder had $\eta$ of 0.50 dl/g, Tg of 239° C. and 1% weight loss temperature of 519° C.

Result of Examples 1 to 6 and Comparative Examples 1 to 2 are illustrated in Table 1.

EXAMPLE 7

The polyimide powder obtained in Examples 1 to 6 and Comparative Examples 1 to 2 were hot pressed at 400° C., under pressure of 50 kg/cm$^2$ to prepare press sheets having a thickness of 100 $\mu$cm.

The number of fish eyes and bubbles per 25 cm$^2$ of the press sheet was counted and illustrated in Table 2.

The results of Table 2 illustrate that molded articles prepared from the polyimide powder obtained by the invention contain small numbers of fish eyes and bubbles and have good processing ability.

TABLE 1

|  | Diamine Compound | Tetracarboxylic dianhydride | Yield (%) | $\eta$ (dl/g) | Tg (°C.) | 1% Weight loss temperature (°C.) |
|---|---|---|---|---|---|---|
| Example 1 | 1,3-bis(3-amino-phenoxy)benzene | P* | 98.5 | 0.51 | 221 | 521 |
| Comp. Ex. 1 | ↑ | P | 98 | 0.50 | 221 | 479 |
| Comp. Ex. 2 | ↑ | P | 98.6 | 0.51 | 221 | 498 |
| Example 2 | 4,4'-bis(3-amino-phenoxy)biphenyl | P | 98 | 0.50 | 252 | 540 |
| Example 3 | 3,3'-diamino-benzophenone | B** | 97 | 0.50 | 239 | 522 |
| Example 4 | 1,3-bis(3-amino-phenoxy)benzene | P | 98.5 | 0.51 | 221 | 523 |
| Example 5 | 4,4-bis(3-amino-phenoxy)biphenyl | P | 98 | 0.50 | 252 | 542 |
| Example 6 | 3,3'-diamino-benzophenone | B | 97 | 0.50 | 239 | 519 |

Note:
*P . . . Pyromellitic dianhydride
**B . . . 3,3',4,4'-Benzophenonetetracarboxylic dianhydride

TABLE 2

| Polyimide powder for press sheet preparation | Number per 25 cm$^2$ of press sheet | |
|---|---|---|
|  | Fish eyes | Bubbles |
| Example 1 | 3 | 7 |
| Example 2 | 0 | 2 |
| Example 3 | 1 | 5 |
| Example 4 | 2 | 8 |
| Example 5 | 0 | 1 |
| Example 6 | 2 | 4 |
| Comp. Ex. 1 | 11 | 36 |
| Comp. Ex. 2 | 8 | 21 |

What is claimed is:

1. A process for preparing a polyimide by reacting a diamine compound represented by the formula (I):

$$H_2N-R_1-NH_2 \quad (I)$$

wherein $R_1$ is a divalent radical selected from the group consisting of an aliphatic group, alicyclic group, monocyclic aromatic group, fused polycyclic aromatic radical group and polycyclic aromatic group connected to each other through a direct bond or a bridge member, with a tetracarboxylic dianhydride having the formula (II):

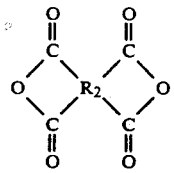

(II)

wherein $R_2$ is a tetravalent radical selected from the group consisting of an aliphatic group, alicyclic group, monocyclic aromatic group, fused polycyclic aromatic group and polycyclic aromatic group connected to each other through a direct bond or a bridge member, to prepare a polyimide having a recurring units represented by the formula (III):

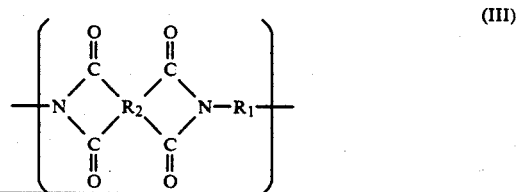

(III)

wherein $R_1$ and $R_2$ are individually selected from the group consisting of an aliphatic group, alicyclic group, monocyclic aromatic group, fused polycyclic aromatic group and polycyclic aromatic group connected to each other through a direct bond or a bridge member, $R_1$ is a divalent radical and $R_2$ is a tetravalent radical; comprising the steps of dissolving the diamine compound of the formula (I) and the tetracarboxylic dianhydride of the formula (II) in separate phenol-based solvents selected from the group consisting of phenol, m-cresol, o-cresol, p-cresol, cresylic acid, ethylphenol, isopropylphenol, tert-butylphenol, xylenol, chlorophenol, dichlorophenol, phenylphenol and mixtures thereof, respectively, mixing the resultant monomer solutions and reacting at a temperature of from 100° to 300° C. to prepare the corresponding polyimide.

2. The process of claim 1 wherein the monomer solution of the tetracarboxylic dianhydride is prepared in the presence of an organic base selected from the group consisting of triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline and isoquinoline.

3. The process of claim 1 wherein each monomer solution has a concentration of from 5 to 50% by weight of the diamine compound and the tetracarboxylic dianhydride, respectively.

4. The process of claim 1 wherein each monomer solution has a concentration of from 5 to 50% by weight of the diamine compound and the tetracarboxylic dianhydride, respectively and the amount of the organic base present in the monomer solution of the tetracarboxylic dianhydride is from 0.1 to 10 moles per mole of the tetracarboxylic dianhydride.

5. The process of claim 1 wherein $R_1$ of the diamine compound in the formula (I) is the polycyclic aromatic radical connected to each other through the direct bond or the bridge member and is represented by the formula (V):

(V):

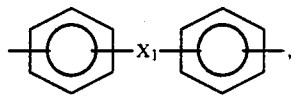

wherein $X_1$ is a direct bond, $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$

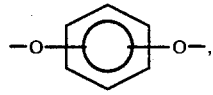

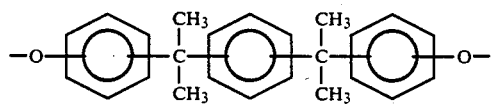

or

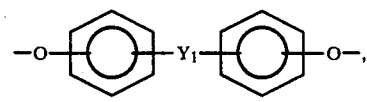

wherein $Y_1$ is a direct bond, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$, $-CO-$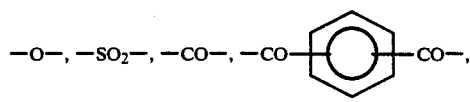

-continued

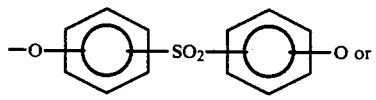

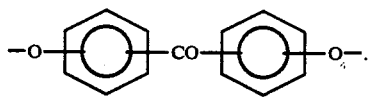

6. The process of claim 1 wherein $R_2$ of the tetracarboxylic dianhydride in the formula (II) is the polycyclic aromatic radical connected to each other through the direct bond or the bridge member and is represented by the formula (VI):

(VI)

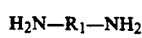

wherein $X_2$ is a direct bond, $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$,

or

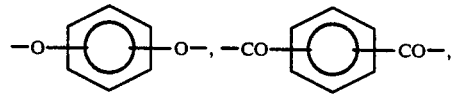

wherein $Y_2$ is a direct bond, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$ or $-CH_2-$.

7. The process of claim 1 wherein the tetracarboxylic dianhydride is pyromellitic dianhydride.

8. A process for preparing a polyimide by reacting a diamine compound represented by the formula (I):

$$H_2N-R_1-NH_2 \qquad (I)$$

wherein $R_1$ is a divalent radical selected from the group consisting of an aliphatic group, alicyclic group, monocyclic aromatic group, fused polycyclic aromatic radical group and polycyclic aromatic group connected to each other through a direct bond or a bridge member, with a tetracarboxylic dianhydride having the formula (II):

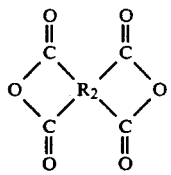

(II)

wherein R₂ is a tetravalent radical selected from the group consisting of an aliphatic group, alicyclic group, monocyclic aromatic group, fused polycyclic aromatic group and polycyclic aromatic group connected to each other through a direct bond or a bridge member, to prepare a polyimide having a recurring unit represented by the formula (III):

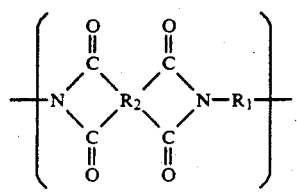

(III)

wherein R₁ and R₂ are individually selected from the group consisting of an aliphatic group, alicyclic group, monocyclic aromatic group, fused polycyclic aromatic group and polycyclic aromatic group connected to each other through a direct bond or a bridge member, R₁ is a divalent radical and R₂ is a tetravalent radical; comprising the steps of reacting the diamine compound of the formula (I) and the tetracarboxylic dianhydride of the formula (II) in the presence of an organic base selected from the group consisting of triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline and isoquinoline in a phenol based solvent selected from the group consisting of phenol, m-cresol, o-cresol, p-cresol, cresylic acid, ethylphenol, isopropylphenol, tert-butylphenol, xylenol, chlorophenol, dichlorophenol, phenylphenol and mixtures thereof to obtain a solution of a polyamic acid represented by the formula (IV):

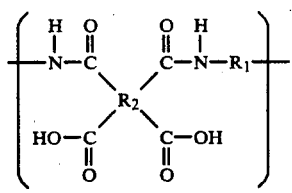

(IV)

wherein R₁ and R₂ are individually selected from the group consisting of an aliphatic alicyclic, monoaromatic, and condensed aromatic radical and noncondensed aromatic radical connected to each other through a direct bond or a bridge member, R₁ is a divalent radical and R₂ is a tetravalent radical, and heating the solution to a temperature of from 100° to 300° C. to prepare corresponding polyimide.

9. The process of claim 8 wherein the amount of the organic base present is from 0.1 to 10 moles per mole of the tetracarboxylic dianhydride of the formula (II).

10. The process of claim 8 wherein the solution has a concentration of the polyamic acid of from 5 to 50% by weight.

11. The process of claim 8 wherein R₁ of the diamine compound in the formula (I) is the polycyclic aromatic radical connected to each other through the direct bond or the bridge member and is represented by the formula (V):

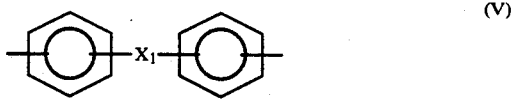

(V)

wherein X₁ is a direct bond, —CH₂—, 

—S—, —O—, —SO₂—, —CO—,

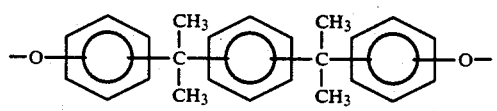

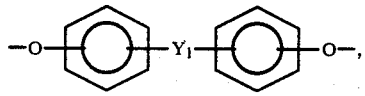

or

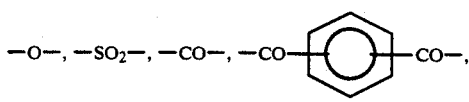

wherein Y₁ is a direct bond, 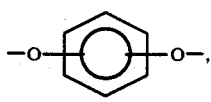, —S—,

—O—, —SO₂—, —CO—, —CO 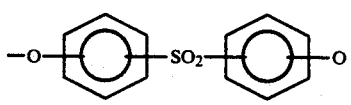 CO—,

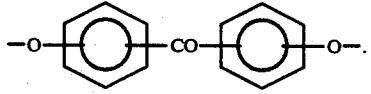

—O—⬡—SO₂—⬡—O or

—O—⬡—CO—⬡—O—.

12. The process of claim 8 wherein R₂ of the tetracarboxylic dianhydride in the formula (IV) is the polycyclic aromatic radical connected to each other through the direct bond or the bridge member and is represented by the formula (VI):

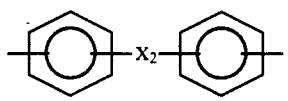
(VI)

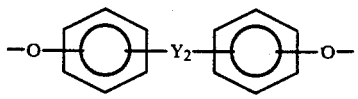

wherein $X_2$ is a direct bond, $-CH_2-$, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$,

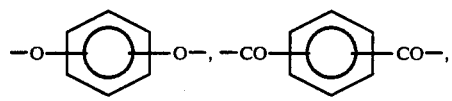

-continued or

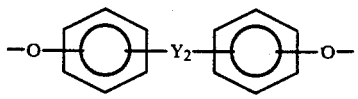

wherein $Y_2$ is a direct bond, $-\underset{\underset{CH_3}{|}}{\overset{\overset{CH_3}{|}}{C}}-$, $-\underset{\underset{CF_3}{|}}{\overset{\overset{CF_3}{|}}{C}}-$, $-S-$, $-O-$, $-SO_2-$, $-CO-$ or $-CH_2-$.

13. The process of claim 8 wherein the tetracarboxylic dianhydride is pyromellitic dianhydride.

* * * * *

UNITED STATES PATENT AND TRADEMARK OFFICE
CERTIFICATE OF CORRECTION

PATENT NO. : 5,210,174
DATED : May 11, 1993
INVENTOR(S) : Shoji TAMAI et al It is certified that error appears in the above-identified patent and that said Letters Patent is hereby corrected as shown below:

In column 6, line 27, delete formula (VI) and insert new formula (VI) as follows:

(VI)

In column 16, line 19, delete (VI) and insert new formula (VI) as follows:

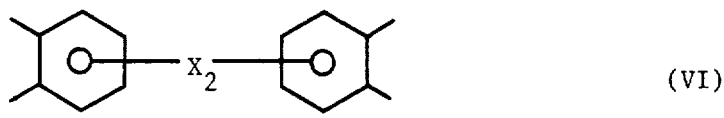

(VI)

In column 19, line 1, delete the formula and insert the following formula:

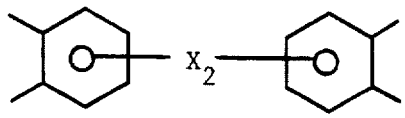

UNITED STATES PATENT AND TRADEMARK OFFICE
CERTIFICATE OF CORRECTION

PATENT NO. : 5,210,174
DATED : May 11, 1993
INVENTOR(S) : Shoji Tamai, et al

It is certified that error appears in the above-indentified patent and that said Letters Patent is hereby corrected as shown below:

In column 19, line 1, delete the formula and insert the following formula:

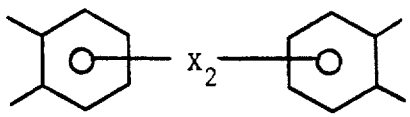

Signed and Sealed this

Twelfth Day of April, 1994

Attest:

BRUCE LEHMAN

*Commissioner of Patents and Trademarks*

*Attesting Officer*